R. C. SPRATLING.
INNER TUBE FOR PNEUMATIC TIRES.
APPLICATION FILED FEB. 4, 1916.
1,206,386. Patented Nov. 28, 1916.
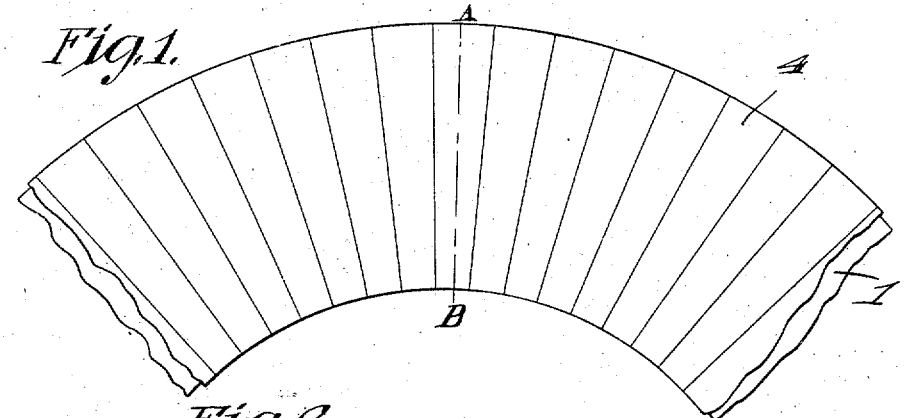
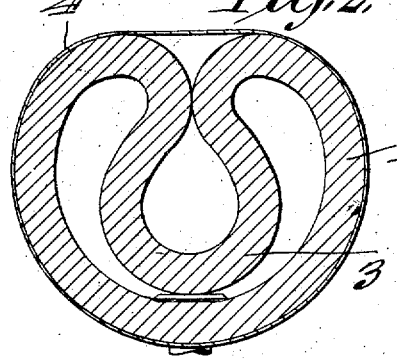
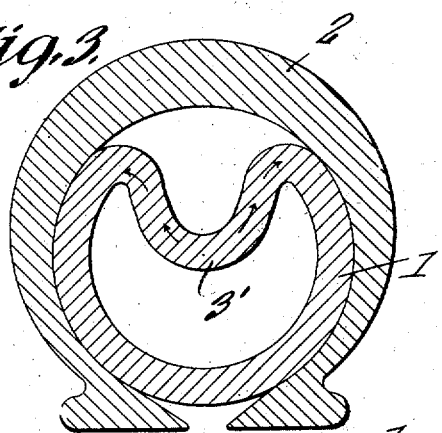
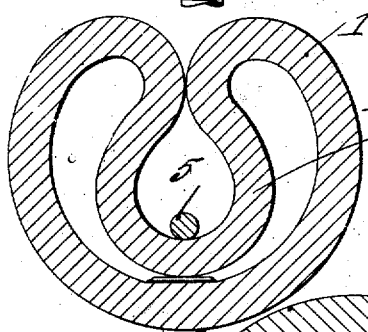
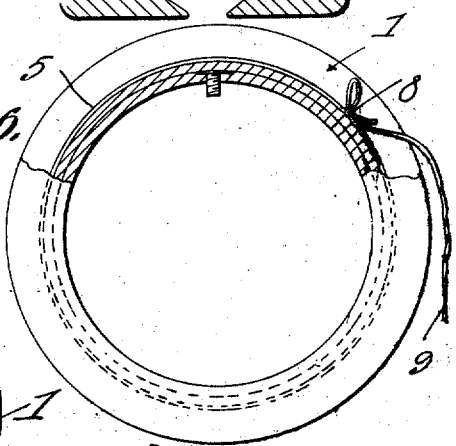
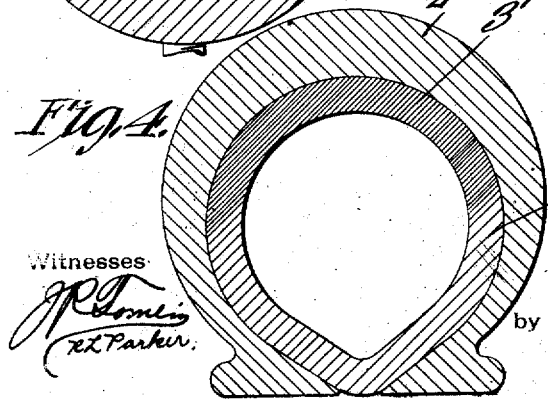
R. C. Spratling, Inventor

UNITED STATES PATENT OFFICE.

ROPER C. SPRATLING, OF OPELIKA, ALABAMA.

INNER TUBE FOR PNEUMATIC TIRES.

1,206,386.

Specification of Letters Patent. Patented Nov. 28, 1916.

Application filed February 4, 1916. Serial No. 76,199.

*To all whom it may concern:*

Be it known that I, ROPER C. SPRATLING, a citizen of the United States, residing at Opelika, in the county of Lee and State of Alabama, have invented a new and useful Inner Tube for Pneumatic Tires, of which the following is a specification.

This invention relates to inner tubes for pneumatic tires, one of its objects being to provide, as an article of manufacture, an inner tube which is provided with restraining means whereby said tube is held in a collapsed condition so as to be readily inserted into the casing of a tire after which, by the removal of the restraining means, the inner tube will be free to expand by its inherent elasticity so as to be positioned with an inwardly bowed annular portion back of the tread portion of the casing of the tire.

A further object is to provide an inner tube which has comparatively thick rubber walls so that when air under pressure is directed into the tube the inwardly bowed annular portion will be forced outwardly against the inner surface of the tread portion of the casing and will be placed under compression transversely so that in the event of the casing or the inner tube being punctured, the inner tube will, by reason of the lateral compression to which it is subjected, promptly expand so as to fill the puncture and prevent the escape of air from the tube.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings, Figure 1 is a side elevation of a portion of an inner tube in the condition in which it is marketed. Fig. 2 is a section on line A—B Fig. 1. Fig. 3 is a transverse section through a tire showing the inner tube seated therein after the removal of its restraining means and prior to the admission of air under pressure to the interior of the tube. Fig. 4 is a transverse section similar to Fig. 3 and showing the inner tube inflated by air under pressure so as to place the tread portion of the inner tube under transverse compression. Fig. 5 is a view similar to Fig. 2 and showing a modified form of restraining means. Fig. 6 is a view partly in side elevation and partly in section of the inner tube restrained by the means shown in Fig. 5, said figure being on a reduced scale.

Referring to the figures by characters of reference 1 designates an inner tube formed of soft rubber and having its wall of a thickness varying from $\frac{1}{16}$ of an inch to one inch, although it is to be understood that it can under some conditions be made even thicker. The diameter of the tube is greater than the internal diameter of the tire casing 2 with which it is to be used and when the tube is sold to the trade it is provided with an annular inwardly extending fold 3, the tube being provided with a restraining means whereby it will stay in its folded condition until released from the restraining means. One form of restraining means employed is a tape 4 wrapped around the tube so as to form a continuous casing although it is to be understood that, if preferred and as shown in Figs. 5 and 6, a cord 5 may be extended longitudinally within the fold 3 and fastened at its ends by a slip knot 8, one of the terminals of the cord being extended beyond the fold, as shown at 9 so as to be easily grasped to cause the knot to be untied when said end 9 is pulled. When the tube is in its folded or collapsed condition, said end 9 is pulled. When the tube is in its folded or collapsed condition, its diameter will be considerably less than the internal diameter of the casing 2 with which it is to be used. Thus the tube can be easily inserted into the casing 2, whereas should the user be compelled to produce the fold 3 within the tube in order to insert the tube into the casing, it will be found to be an almost impossible operation in the absence of special tools provided for that purpose, due primarily to the thickness of the tube.

As has been pointed out, the inner tube is to be placed on the market as an article, while in its folded or collapsed condition. When it is desired to place the tube in a casing 2 it is inserted thereinto while in its restrained condition and after it has been properly positioned, it is relieved of its restraining means. If a tape 4 is employed, this tape can be cut at different points and the pieces removed from between the tube and the casing. If a cord 7 is employed the knot 8 can be untied by pulling on the end 9 after which said cord can be withdrawn from between the tube and the casing. As soon as the inner tube has been relieved of its restraining means it will expand, by reason of its inherent elasticity, until it fits snugly against the inner surface of the casing 2 except along the tread portion of the casing. The inner tube will here bulge inwardly so as to form an annular chamber, as will be apparent by referring to Fig. 3. By forcing air under pressure into the inner tube, this inwardly bowed portion indicated at 3' will be pressed outwardly against the inner surface of the tread portion of the casing 2 and as the length of the arc formed by the inner surface of the casing between the sides of the inwardly bowed portion is much less than the transverse length of the bowed portion, it will be apparent that when this bowed portion is pressed outwardly against the casing the rubber constituting said bowed portion will be placed under compression transversely with the result that that portion of the inner tube lying directly back of the tread portion of the casing will be greatly condensed. Thus it will be seen that should the inner tube be punctured along the tread portion, the condensed rubber forming said tread portion of the inner tube will press, of its own force, into the orifice so as to completely seal it and prevent the escape of air from the inner tube.

What is claimed is:—

1. As an article of manufacture, an endless inner tube for pneumatic tires having an annular inwardly extended fold and a restraining means for holding the tube in its folded condition, said restraining means being removable bodily from the tube.

2. As an article of manufacture, an endless inner tube for pneumatic tires, having relatively thick walls of soft rubber provided with a single inwardly extending annular fold, and restraining means detachably connected to the tube for holding it in its folded condition.

3. As an article of manufacture, an endless inner tube for pneumatic tires, having relatively thick walls of soft rubber provided with a single inwardly extending annular fold, and restraining means detachably connected to the tube for holding it in its folded condition, the external diameter of the tube when released from its restraining means being greater than the internal diameter of the casing with which it is to be used.

4. As an article of manufacture, an endless inner tube for pneumatic tires, having relatively thick walls of soft rubber, and restraining means detachably connected to the tube for holding the tube partly collapsed out of normal position with a single inwardly extending annular fold, said fold being adapted to return automatically to its normal position when released from its restraining means, the external diameter of the tube when released from said restraining means being greater than the internal diameter of the casing with which it is to be used.

5. As an article of manufacture, an endless inner tube for pneumatic tires having relatively thick walls of soft rubber provided with a single inwardly extending annular fold, and a restraining cord seated within the fold and having detachably connected end portions.

In testimony that I claim the foregoing as my own, I have hereto affixed my signature in the presence of two witnesses.

ROPER C. SPRATLING.

Witnesses:
E. E. ROSBOROUGH,
W. H. SPERNANCE.